V. GUIDUGLI.
DOUGH APPORTIONING MACHINE.
APPLICATION FILED OCT. 31, 1912.

1,116,057.

Patented Nov. 3, 1914.
4 SHEETS—SHEET 1.

Witnesses
Robert H. Weir
Arthur B. Framke.

Inventor
Vincenzo Guidugli
by Alberto N. Graham
Attys.

V. GUIDUGLI.
DOUGH APPORTIONING MACHINE.
APPLICATION FILED OCT. 31, 1912.

1,116,057.

Patented Nov. 3, 1914.
4 SHEETS—SHEET 2.

Witnesses
Robert H. Weir
Arthur B. Framke.

Inventors
Vincenzo Guidugli
Alberto N. Gualano
by
Attys.

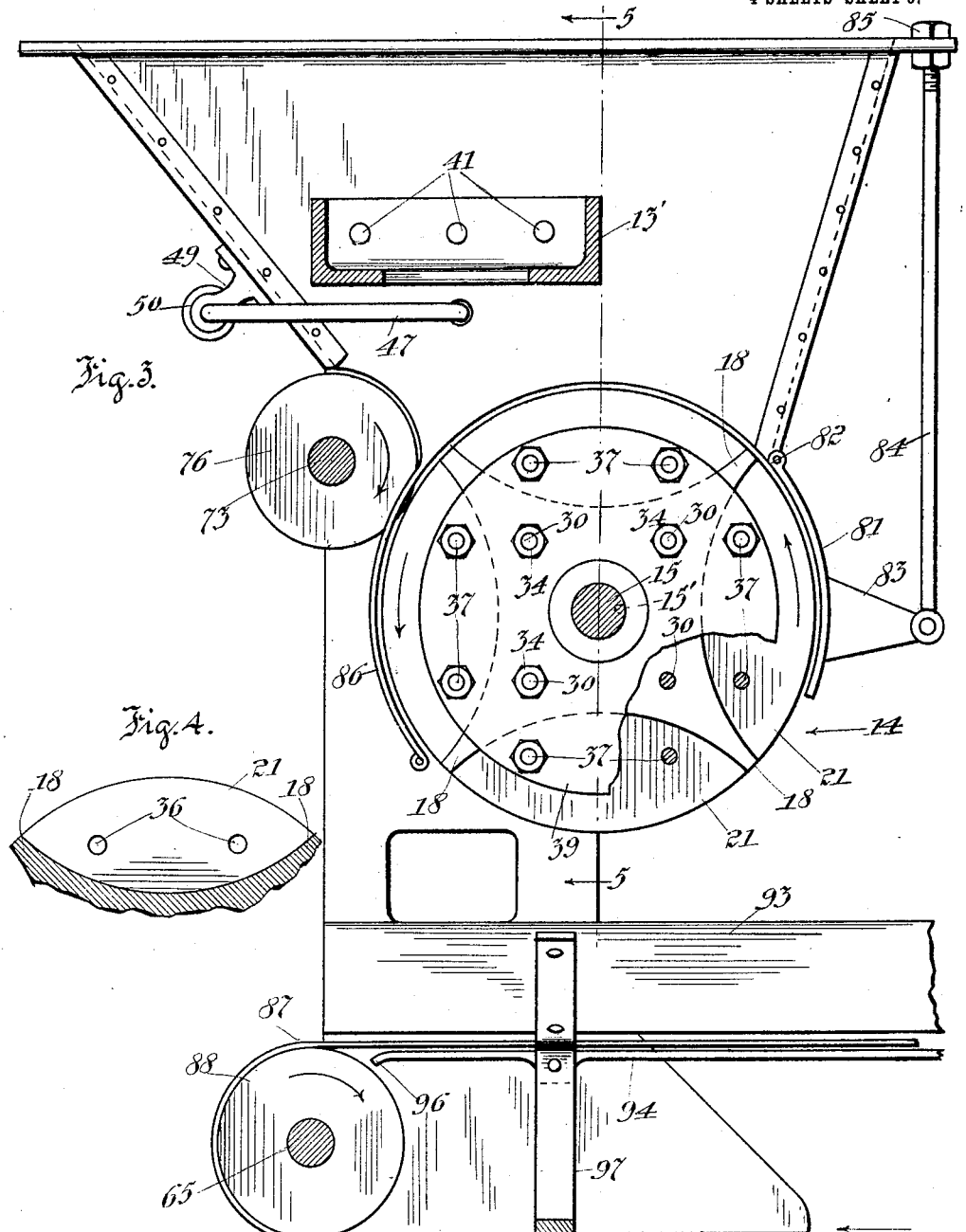

V. GUIDUGLI.
DOUGH APPORTIONING MACHINE.
APPLICATION FILED OCT. 31, 1912.
1,116,057.
Patented Nov. 3, 1914.
4 SHEETS—SHEET 4.
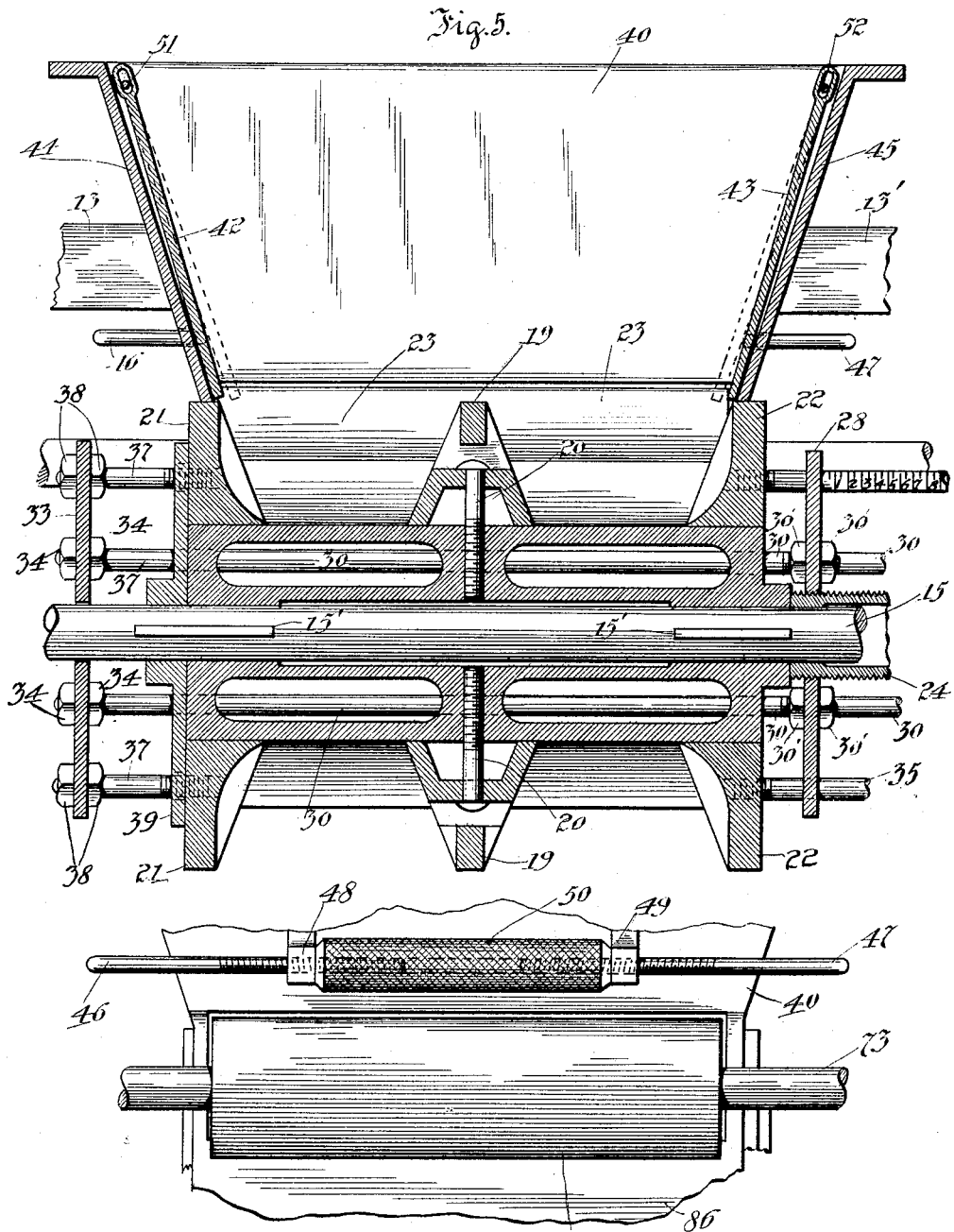

UNITED STATES PATENT OFFICE.

VINCENZO GUIDUGLI, OF CHICAGO, ILLINOIS.

DOUGH-APPORTIONING MACHINE.

1,116,057.   Specification of Letters Patent.   Patented Nov. 3, 1914.

Application filed October 31, 1912. Serial No. 728,871.

*To all whom it may concern:*

Be it known that I, VINCENZO GUIDUGLI, a citizen of the United States, residing at Chicago, in the county of Cook and State of Illinois, have invented certain new and useful Improvements in Dough-Apportioning Machines, of which the following is a specification.

My invention relates to improvements in dough apportioning machines.

One of the objects of my invention is to provide a machine which will automatically and rapidly divide a batch of dough, into loaf size portions, which, when baked, will produce loaves of bread of uniform size and weight.

Another object of my invention is to provide, in a machine of the character referred to, means for readily adjusting the machine according to an indicating scale, so that the size and weight of the portion, to form the loaf, may be readily determined and varied without interfering with the uniformity of its operation.

Other, further and more specific objects of my invention will become readily apparent, to persons skilled in the art, from a consideration of the following description when taken in conjunction with the drawings, wherein—

Figure 1:
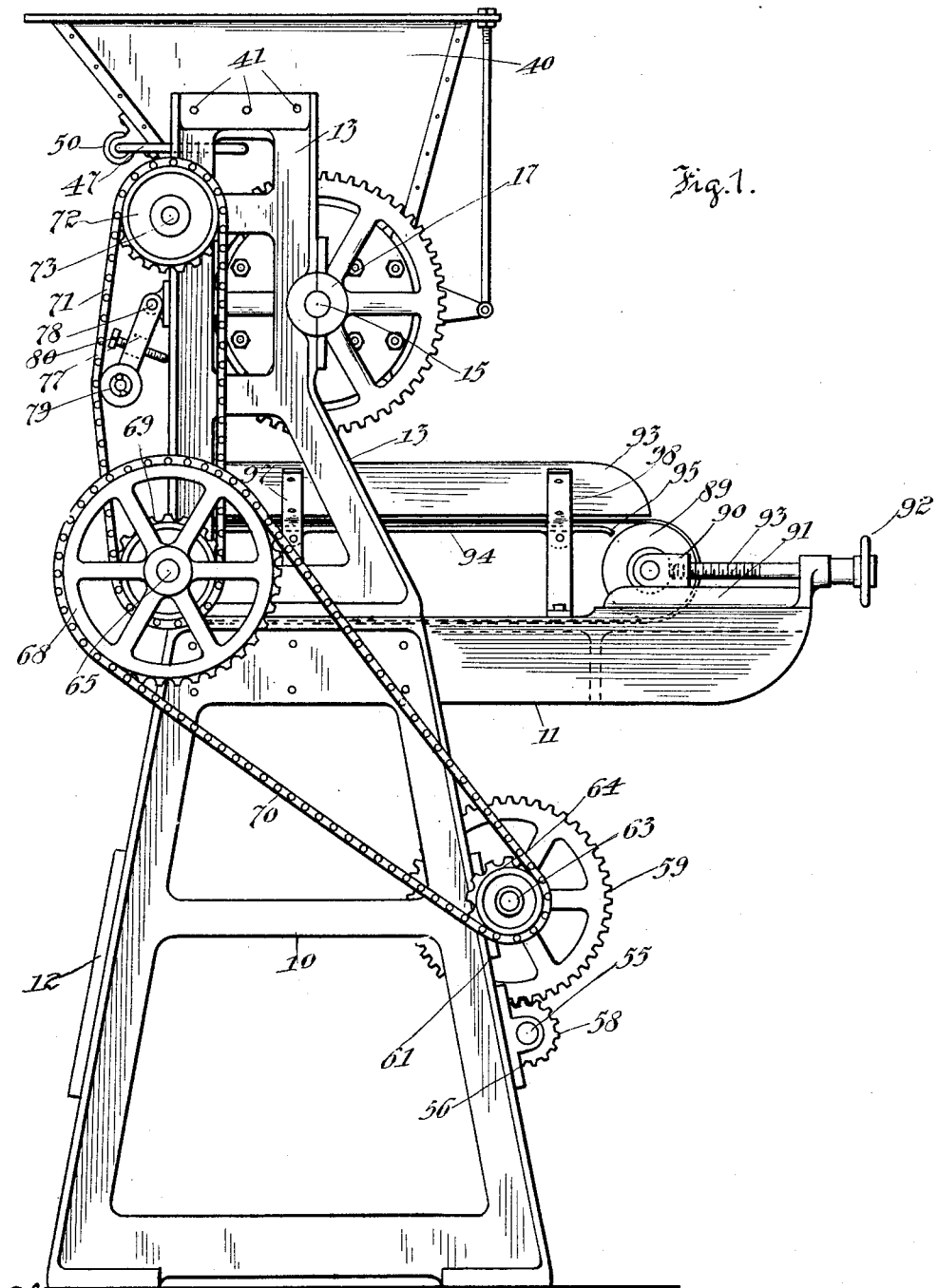
Figure 2:
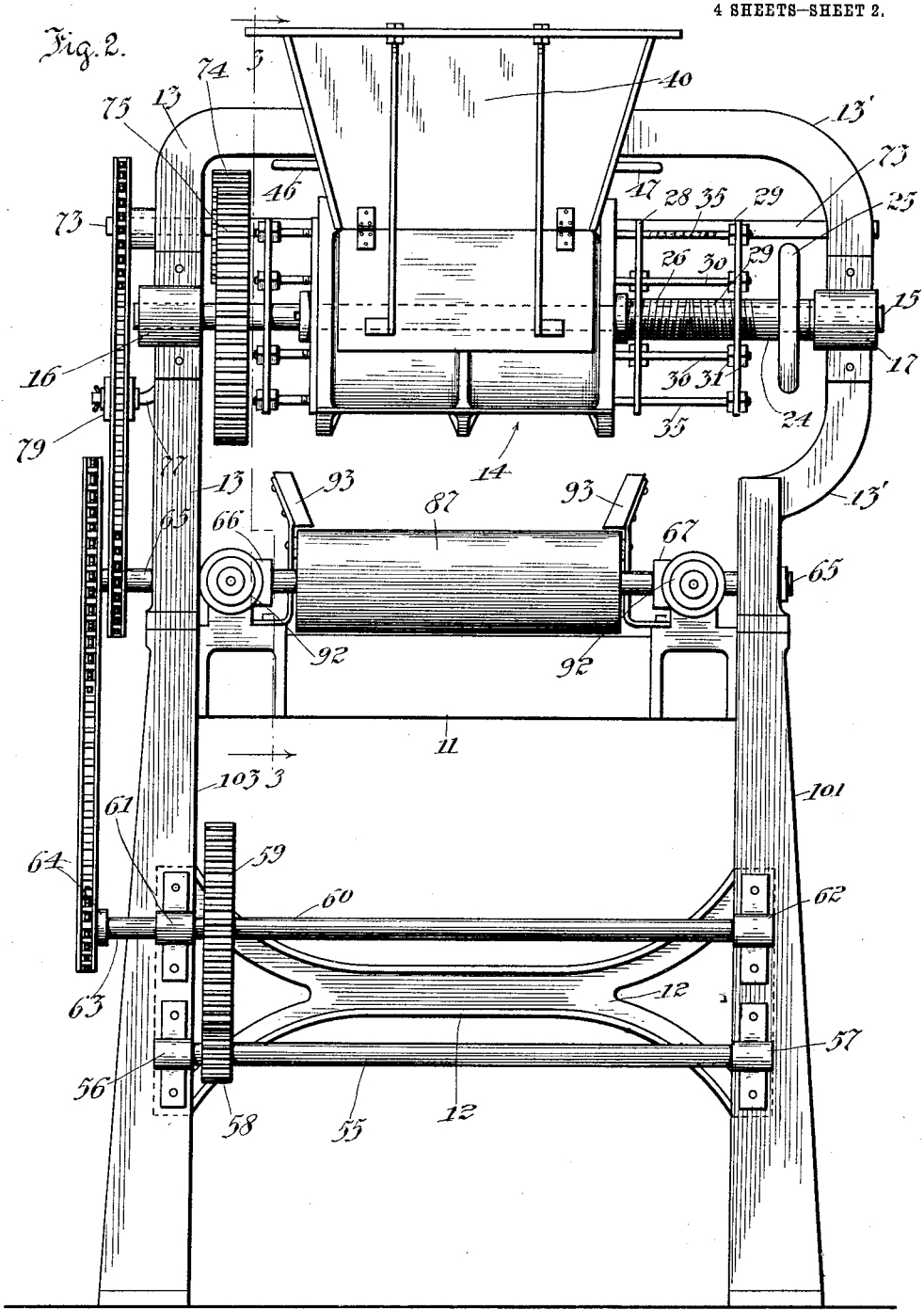

Figure 1 is a side elevation of the machine; Fig. 2 is a front elevation of the machine; Fig. 3 is an enlarged section taken on line 3—3 of Fig. 2; Fig. 4 is a detail; Fig. 5 is a central, vertical section, taken on line 5—5 of Fig. 3; and Fig. 6 is a detail of the hopper adjusting machine and the dough feeding roller.

In all the views the same reference characters indicate similar parts.

The base portion of my machine, upon which the operating mechanism is mounted, consists of the legs 10 and 10' united by a base cross piece 11, and near the bottom by a stay bar, 12, substantially bifurcated at each end and secured to the respective legs. 13 and 13' provide a housing for the shafts of the machine and constitutes a frame that is superposed upon the respective legs 10 and 10' of the sub base and appropriately secured thereto.

A pocketed rotatable drum 14, is secured on a shaft 15, by means of keys 15', which shaft is provided with bearings 16 and 17 on the frame legs 13 and 13' respectively. The spider or frame of the drum is provided with radially projecting and longitudinally extending arms 18, of which there are four. These arms extend to the full diameter and length of the drum and the pockets are contained in the spaces between the arms. Fixed, tapering partitions 19, are secured to the drum frame near the longitudinal center thereof, by means of bolts 20. The general outlines of these pieces are shown in Fig. 4. They are tapered in the manner shown so as to fit conveniently between the arms and to complete the general circumferential contour of this portion of the drum.

Longitudinally adjustable segmental end pieces 21 are provided on the left hand end of the drum and similarly adjustable end pieces 22 are contained upon the right hand end of the drum. These pieces are of the general contour shown in Fig. 4 and are adapted to fit in the frame of the drum between the arms 18, and form the end walls for the adjustable pockets 23. These end pieces, 21 and 22, are adapted to be adjustably moved toward and from the central partition 19 for the purpose of adjusting the area or capacity of the respective pockets to determine the size of the loaf portion.

The drum shows four pockets on each side of the partition 19 or a total of eight pockets in the drum. Each pocket is to contain a portion of dough of desirable size designed to form a loaf of bread when baked.

Means for simultaneously adjusting all of the pockets will now be described. Overlying one end of the shaft 15 is a sleeve 24 rotatable thereon and having fixed thereto a hand wheel 25, by which it may be rotated. The sleeve is provided with a right and left hand screw thread 26 and 27, respectively, engaging with which are disks 28 and 29 respectively. When the hand wheel 25 is rotated, in one direction, the disks 28 and 29 will be drawn toward each other and when the hand wheel is rotated in the opposite direction the disks will be separated from each other by the operation of the right and left hand screw. Rods 30, of which there are four, are connected to the disk 28 as by nuts 30'. These rods pass freely through the frame of the drum, as clearly shown in Fig. 5, and engage a similar disk 33 that slides freely over the shaft 15, the rods being secured thereto by means of nuts 34. Shorter rods 35 are connected to the disk 29 and are guided in the disk 28 and are secured to the longitudinally adjustable pieces 22, which form the end walls of one set of pockets. These rods are secured in perforations 36, shown in Fig. 4, and two rods are secured to each one of the pieces 21 and 22 so that they may be properly guided and held in their longitudinal movement against lateral or vertical displacement. In like manner, eight shorter rods 37, are secured to the disk 33 by means of nuts 38, and pass freely through the guiding flange 39, which constitutes part of the frame of the drum and into the longitudinally movable pocket pieces 21.

From the foregoing description it is obvious that when the hand wheel 25 is turned in one direction, the pieces 21 and 22, will be made to approach each other, or approach nearer to the central partition 19 and thereby contract the area of the respective pockets and that when the hand wheel is turned in the opposite direction the pieces 21 and 22 will be caused coincidently to be moved away from the central partition 19, and thereby increase the area of all of the pockets. The extent to which the pieces 21 and 22 may be separated from the central partition may be readily indicated by a graduated scale on one of the rods, as on rod 35, as indicated in Fig. 5, and the divisions of this scale may represent ounces, so as to indicate the weight capacity of each of the pockets. In this manner the hand wheel 25 may be rotated until the disk 28 indicates the desired number of ounces of dough that the pockets are to contain by its position along the graduated rod 35.

A hopper 40 for containing a batch of dough, from which the portions subsequently to form the loaves are to be taken, by the operation of my machine, is secured to the side frames 13 and 13' as at 41 and is thus held in proper position with reference to the rotated pocketed drum 14.

When the end pieces 21 and 22 are longitudinally adjustable on the drum, for the purpose of varying the area of the pockets, that the size of the portion extracted from the batch by the machine may be varied for producing loaves of bread of different weight, it is desirable to have the area of the hopper coincidently varied so that the side walls of the hopper will always register with the inner surfaces of the pieces 21 and 22 respectively. I therefore provide false end walls 42 and 43, in the hopper, that may be moved inwardly to suitable fixed positions to coincide with the positions of the respective end walls of the rotating drum, as shown in dotted lines in Fig. 5. Through slotted holes in the fixed end walls 44 and 45 of the hopper, rods 46 and 47 pass freely and are connected, or fixed, to the false end walls 42 and 43 respectively. These rods are inturned upon themselves, as shown in Fig. 6, and are screw threaded on their inner ends and pass freely through guiding brackets 48 and 49, respectively, secured to the said hopper. The rods, 46 and 47, are provided with right and left hand screw terminals, and the turn buckle 50 has screw threaded engagement with these ends of the rods, so that when the turn buckle is rotated in one direction the rods 46 and 47, will be moved toward each other, and when it is rotated in the opposite direction they will be moved away from each other and thereby the false end walls or plates 42, and 43, in the respective ends of the hopper, may be moved away from their respective fixed plates 44 and 45, or toward said plates, as desired, so that they may be adjusted in positions consistent with the positions occupied by the adjustable end pieces 21 and 22 of the hopper pockets. The false, interior walls 42 and 43, of the hopper, are each slotted at their upper ends, as at 51, and have pivotal connection with permanent portions of the hopper 40, so that when these plates, or walls, are moved inwardly, they may also move downwardly, as shown in dotted lines in Fig. 5, so as not to leave any space into which the dough might crowd or be forced without passing directly into the pockets.

A power shaft 55, to which the source of power may be connected, is mounted in bearings 56 and 57 that are secured to the legs 10 and 10' respectively. It is provided with a geared pinion 58, which meshes with the gear wheel 59, which is secured to the shaft 60, that is mounted in bearings 61 and 62. The shaft 60 is prolonged, as at 63, upon which is carried a sprocket wheel 64.

A shaft 65 is carried in bearings 66 and 67 that are supported on the bed 11. To this shaft are secured sprocket wheels 68 and 69. The former is connected by means of a chain 70, to wheel 64, on shaft 63, and the other wheel is connected, by means of chain 71, to a sprocket wheel 72, that is mounted upon the shaft 73. The shaft 73 carries a geared pinion 74, that has rotative association with the gear wheel 75, that is fixed to the shaft 15. By means of this train of gears, the pocketed drum 14 may be rotated.

The shaft 73 carries a roller 76, that is let into one side of the hopper 40, and is designed to be in constant contact with the dough that is to be contained within the hopper. It is adapted to be rotated in directions shown by the arrow whereby to force the dough into the pockets.

A chain tightener, for taking up the slack, on the loose side of the chain 71, is provided in a pivoted lever 77, pivoted as at 78 to the side frame 13. On its free extended end it carries a roller 79 that is brought into contact with the chain and the position of the roller is adjustable by screw 80.

An apron, or guard 81, to prevent the dough from falling out of the pockets, in which it is to be deposited, is attached to the hopper as at 82, and is provided with an outwardly extending bracket 83, to which is attached a supporting rod 84, fixed to the upper edge of the hopper, as at 85. A similar apron, or guard 86, is secured to the hopper and partially surrounds the pocketed drum on the opposite side. The object of this apron or guard is to retain dough in the pockets until the pockets have been moved to the proper place in the rotation of the drum where the dough is to be dropped therefrom.

When the dough that is to be contained in the hopper 40, is placed in the hopper, it immediately fills the underlying confronting pockets, in the pocketed drum, and as the drum is rotated, as in the direction shown by the arrow, in Fig. 3, the roller 76 tends to crowd or force the dough more firmly into the approaching pockets. The arm 18, which bounds the pockets, is brought into substantial contact with the rotating surface of the drum 76, when the portion contained in the pocket, at this time is passing the drum, and the dough is severed by the approximation of the arms 18 with the parallel surface of the drum. The severed portion of the dough, contained in the passing pockets is retained therein by the apron, or guard 86, until the arm 18 of the said pocket has passed sufficiently beyond the boundary of the apron, 86, as to permit the dough to drop from the pocket to a receiving conveyer below.

The conveyer consists of a band, or belt 87, that passes over a drum 88, secured to the shaft 65, that is located at the rear end of the machine. A corresponding drum, 89, is located at the front of the machine, and over this drum the belt 87 also passes. The drum 89 is mounted in laterally movable bearings, 90, that are movable in guide ways 91, by means of hand wheels 92, through the agency of the rods 93 by which they are connected. By this means the belt, or band 87, may be tightened.

Guide boards, or side boards, 93, are placed on each side of the belt 87, to prevent the dough from falling from the sides of the conveyer.

In the operation of the device, two portions, destined to each become a loaf of bread, are severed from the batch at the same time and eight such portions are severed from the batch and delivered to the conveyer at each revolution of the drum. The conveyer 87, conveys the dough, falling from the drum to the front end of the machine, from which conveyer it drops off onto a proper receiving table. It is then removed and placed in pans ready for baking.

In order that the conveyer belt 87 may properly be maintained in a horizontal plane, and not be sagged, or downwardly deflected, by the weight of the dough thereon, I provide a stable support for the said conveyer band, or belt, in a plate 94, that immediately underlies the said band, or belt, and over which it passes. It is downturned at each of its ends, as at 95 and 96, to prevent accidental engagement of the belt and it is held in position by means of the brackets 97 and 98 that are employed to support the side boards 93.

While I have herein described a specific embodiment of my invention, for the purpose of clear disclosure, it is evident that considerable variation may be made therefrom without departing from the spirit and intent of the appended claims.

What I claim is:

1. In a device of the character described, in combination with a hopper, a frame, comprising a plurality of uniformly disposed arms to constitute side walls for dough receiving pockets; longitudinally adjustable end walls at opposite ends of the pockets, adapted to fit in the depressions in said frame and to be adjustably moved longitudinally thereof; a shaft, adapted to be rotated, and carrying the structure so described; and means, carried by the shaft, and operable from one end thereof to longitudinally adjust the end walls in the grooves formed in the frames between the arms.

2. In a device of the character described, the combination with a hopper; a frame provided with a plurality of arms extending radially and longitudinally thereof and providing depressions between said arms; a shaft, upon which the frame is mounted; end pieces, adapted to fit in said grooves provided in said frame, and to be moved longitudinally thereof; a sleeve, mounted on the said shaft and having a right and left hand thread; means for turning said sleeve; disks making threaded connection with said sleeve; and rods, extending from the said disks to the opposite end pieces respectively, whereby, upon the rotation of said wheel the opposite end pieces are moved to or from one another and the area of the pockets, thus varied.

3. In combination with a hopper; a rotatable drum, forming the bottom wall of said hopper, comprising a frame having longitudinally extending depressions; longitudinally movable oppositely positioned end pieces, longitudinally extending division walls between said depressions, constituting with the end pieces the limit of the pockets contained in said drum; a series of circumferentially extending, fixed partitions, thereby providing two pockets, in the same longitudinal plane; means, carried by the shaft for moving one set of end pieces; means, extending through the frame of said drum, and interconnected with said last mentioned means for moving the opposite set of end pieces, and means for rotating said drum and shaft.

4. In a machine of the character described, the combination of a hopper; a rotor, having a cross section like that of a square the sides of which are curved inward toward the center, thus forming dough receiving pockets; a shaft therefor longitudinally adjustable oppositely positioned end walls adapted to fit in the pockets in the rotor; means carried by said shaft and operable from one end thereof for simultaneously adjusting the said opposite end walls toward or from each other, the walls of the said pocket being tapered inward so as to provide dough receiving pockets having a smaller cross sectional area at their bottom than at their mouths.

In testimony whereof I hereunto set my hand in the presence of two witnesses.

VINCENZO GUIDUGLI.

In the presence of witnesses:
FORÉE BAIN,
ALBERTO N. GUALANA.